United States Patent Office 3,501,484
Patented Mar. 17, 1970

3,501,484
CERTAIN SUBSTITUTED 3 - (2-INDOLYL)-1,2,5,6-TETRAHYDROPYRIDINES AND DERIVATIVES THEREOF
Robert Norman Schut, Edwardsburg, Mich., and Frederick Edmund Ward, Elkhart, Ind., assignors to Miles Laboratories, Inc., Elkhart, Ind., a corporation of Indiana
No Drawing. Filed Jan. 15, 1968, Ser. No. 697,619
Int. Cl. C07d *31/40;* A61k *27/00*
U.S. Cl. 260—295                         4 Claims

ABSTRACT OF THE DISCLOSURE

A series of indolyltetrahydropyridines that are useful for inducing antihistamine and antiserotonin action and preparation thereof by reducing an appropriate 3-(2-indolyl)-1-lower alkyl pyridinium halide.

---

This invention relates to a novel series of compounds having beneficial pharmacological properties. More particularly, this invention relates to a series of indolyltetrahydropyridines and to a process for the preparation thereof.

Compounds of this invention may be represented by the structural formula:

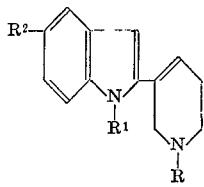

in which R is a member selected from the group consisting of hydrogen and lower alkyl, $R^1$ is a member selected from the group consisting of hydrogen, lower alkyl, aralkyl, substituted aralkyl and aroyl, and $R^2$ is a member selected from the group consisting of hydrogen, lower alkoxy and hydroxy.

The new compounds of this invention may be prepared in the form of a free base and are preferably prepared in the form of an acid addition salt. Advantageously these compounds are prepared in the form of a pharmacologically acceptable acid addition salt. Satisfactory non-toxic acid addition salts may be formed from mineral acids, such as halogen acids or sulfuric acid, or from organic acids, such as citric acid, maleic acid, oxalic acid and other similar suitable acids. Preparation of these acid addition salts will be described in subsequent detailed examples and will not, therefore, be set forth at this point.

The compounds of the invention may be readily prepared by reducing an appropriate 3-(2-indolyl)-1-lower alkyl pyridinium halide. This reaction is preferably carried out in the presence of a suitable solvent, such as methanol, ethanol, or 2-propanol. A suitable reducing agent, such as sodium borohydride, is beneficially used with this reaction. Although the reaction conditions are not considered critical, the reactants are advantageously heated under reflux for between about 1 and 12 or more hours.

An appropriate 3-(2-indolyl)-1-lower alkyl pyridinium halide may be conveniently prepared in a series of reactions in which a suitable hydrazone is cyclized to form an intermediate compound. This cyclization may be effected by a Fischer indole synthesis using a suitable acid catalyst, such as polyphosphoric acid, sulfuric acid, or boron trifluoride. When $R^1$ is benzyl or methyl, the method of choice for cyclization is a thermal indolization. Advantageously, reactants, in a suitable solvent therefor, are heated under reflux in the thermal indolization to effect ring closure.

An indolylpyridine which is produced by the cyclization is further reacted with a halide of the formula R—X. The halide and indolylpyridine in suitable solvents are combined and beneficially heated under reflux for a short period of time, such as about 30 minutes, to form the desired 3-(2-indolyl)-1-lower alkyl pyridinium halide.

Preparation of compounds of this invention may be represented by the equation:

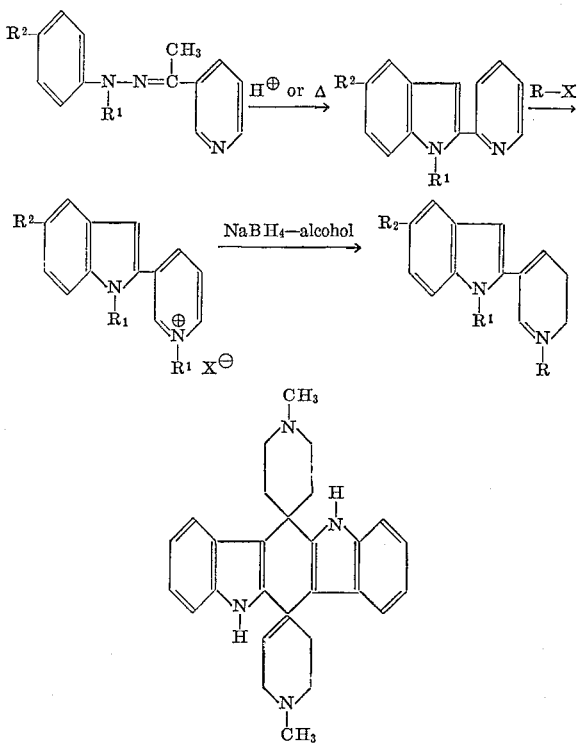

Compounds of the invention have demonstrated beneficial pharmacological properties. In particular, these compounds have been observed to be useful as antihistamine and antiserotonin agents.

Medications may be conveniently prepared with these compounds as active ingredients using fillers, carriers, extenders and excipients generally used in pharmaceutical formulations. The active ingredient may be in the form of the free base and preferably is in the form of a pharmacologically acceptable acid addition salt. Medications may be in solid or liquid states as tablets, capsules, suspensions and similar dosage forms suitable for oral, subcutaneous, intraperitoneal or other convenient means of administration. The free base or acid addition salt may be mixed with common diluents or tableting adjuncts such as cellulose powder, cornstarch, lactose, talc and such, according to accepted manufacturing practices. Unit dosages (mg.) of active ingredient in the medication may be varied so that an adequate amount is present to provide desired therapeutic results without untoward side effects and to permit satisfactory variations in dosages administered. These medications are preferably prepared according to accepted pharmaceutical practices.

Toxicity of active ingredients of this invention were determined by administering graduated doses of active ingredient in aqueous solution intraperitoneally to a group of mice. An $LD_{50}$, a dose at which there was 50% mortality, was observed between about 68.1 and 316 mg./kg.

Antihistamine activity for these compounds was determined by observing response of a guinea pig ileum segment. A properly prepared guinea pig ileum segment was incubated in a bath with the active ingredient to be tested. After incubation for one minute, 0.1 mcg./ml. of histamine was added to the bath. The dimensional response of the segment was measured and an $ED_{50}$ between 0.003 and 0.03 mcg./ml. was observed.

Antiserotonin activity for these compounds was determined by observing response of a rat uterine segment. A properly prepared rat uterine segment was treated with the active ingredient and subjected to a 0.1 mcg./ml. concentration of serotonin. The dimensional response of the segment was measured and an $ED_{50}$ of between 0.0057 and 0.29 mcg./ml. was observed.

A dosage of active ingredient which is administered may be varied dependent upon age, weight, and species of a recipient and magnitude of desired effect. Unit dosages in a medication are preferably selected so that a suitable variation in dosage may be readily obtained. Medications may be administered to a patient orally, intraperitoneally, intravenously and by other suitable routes in accordance with accepted pharmacological techniques.

Antihistamine activity may be obtained with dosages between about 30 and 60 mg./kg. of active ingredient administered orally. Also, antihistamine activity may be obtained with dosages between about 0.01 and 1.0 mg./kg. when the active ingredient is administered intravenously. Antiserotonin activity may be achieved with dosages between about 0.01 and 1.0 mg./kg. of active ingredient when administered intravenously. The particular dosage or effective amount used will vary according to the desired result and response of the individual recipient. Suitable dosages in a particular situation will be apparent to one skilled in the art and, therefore, these representative dosages are not to be considered limitations.

The invention will be further understood by reference to the following examples which describe specific compounds of the invention and processes for the preparation thereof. These examples are representative of some of the novel compounds of the invention and are not intended to limit the scope of the invention as defined in the appended claims.

EXAMPLE I

3-(2-indolyl)-1-methyl-1,2,5,6-tetrahydropyridine

A 33.6 g. sample of 3-(2-indolyl)-1-methylpyridinium iodide was suspended in 500 ml. of 50% aqueous ethanol after which 8 g. of sodium borohydride was slowly added. The solid gradually dissolved during the addition. When the vigorous reaction had subsided the solution was heated under reflux for 1 hour. The alcohol was distilled in vacuo and the residue stirred with NaOH solution. Extraction with $CHCl_3$, drying and concentration in vacuo gave a solid which was stirred in n-hexane-ether to give 17.3 g. of light gray material M.P. 145–147° C. Recrystallization from benzene-ether followed by recrystallization from ether gave the analytical sample M.P. 154–155° C. The ultraviolet spectrum (MeOH) showed maxima at 218 ($\epsilon$ 20,100) and 301 m$\mu$ ($\epsilon$ 20,700). The n.m.r. spectrum (10% $CDCl_3$) showed signals at $\tau$ 7.52 (N-$CH_3$); $\tau$ 6.63 (doublet equiv. to 2 protons, $CH_2N$); $\tau$ 3.93 (multiplet, 1 proton, olefinic); $\tau$ 3.58 (doublet $J_{1,3}$ 4.0 cps. indole-3-H); $\tau$ 2.2–3.0 (aromatic, 4 protons) and $\tau$ 1.66 (indole N-H) p.p.m.

*Analysis.*—Calcd. for $C_{14}H_{16}N_2$ (percent): C, 79.25; H, 7.59; N, 13.21. Found (percent): C, 78.66; H, 7.72; N, 13.22.

3-(2-indolyl)-1-methyl-1,2,5,6-tetrahydropyridine maleate

A solution of 5.00 g. of 3-(2-indolyl)-1-methyl-1,2,5,6-tetrahydropyridine in 200 ml. of ethyl acetate containing a little methanol was treated with 2.9 g. of maleic acid in 30 ml. of ethyl acetate-methanol; the salt was collected and recrystallized from methanol-ethyl acetate; yield 4.83 g., M.P. 185–186° C. The material was dried 2 hours at 100° C. in the Abderhalden pistol;

$\lambda_{max.}^{MeOH}$ 218 (38,400), 301 (24,800) m$\mu$

*Analysis.*—Calcd. for $C_{14}H_{16}N_2 \cdot (CHCO_2H)_2$ (percent): N, 8.54 (total); N (basic), 4.27. Found (percent): N (total), 8.54 (Dumas); N (basic), 4.27, (titration).

EXAMPLE II

3-[2-(1-methyl)indolyl]-1-methyl-1,2,5,6-tetrahydropyridine

A mixture of 24.8 g. (0.205 mole) of 3-acetylpyridine, 25.0 g. (0.205 mole) of 1-methyl-1-phenylhydrazine and 0.2 g. of p-toluenesulfonic acid in 150 ml. of xylene was heated under reflux while the liberated water was collected in a Dean-Starke trap. The xylene was distilled in vacuo leaving 45.0 g. of the substituted hydrazone. A 10.0 g. sample of the hydrazone was mixed with 30 g. of polyphosphoric acid and heated on a steam bath. After the exothermic reaction had subsided the mixture was heated for 15 minutes. Water and dilute NaOH solution were added and the free base was extracted with $CHCl_3$. The solvent was removed and the residue chromatographed on an alumina column using ether as eluent. There was obtained 4 g. of product, M.P. 78–80° C.

*Analysis.*—Calcd. for $C_{14}H_{12}N_2$ (percent): N, 13.47. Found (percent): N, 13.47.

3-[2-(1-methyl)indolyl]-1-methyl-1,2,5,6-tetrahydropyridine

A 4 g. sample of 3-[2-(1-methyl)indolyl]pyridine was dissolved in acetone and treated with 5 ml. of methyl iodide. The mixture was heated under reflux for 30 minutes after which a precipitate was collected and washed with acetone; M.P. 188–190° C. A 17 g. sample of this methiodide was suspended in methanol and 7 g. of $NaBH_4$ was slowly added. After refluxing for 12 hours, the reaction mixture was worked up as described in Example II. The crude product (10.0 g.) was chromatographed over 200 g. of alumina using benzene-ether (1:1) as eluent. The product (5.0 g.) had $\lambda_{max.}^{MeOH}$ 223, 294 m$\mu$

*Analysis.*—Calcd. for $C_{15}H_{18}N_2$ (percent): N, 12.38. Found (percent): N, 12.32.

3-[2-(1-methyl)indolyl]-1-methyl-1,2,5,6-tetrahydropyridine hydrochloride

The 3-[2-(1-methyl)indolyl]-1-methyl-1,2,5,6 - tetrahydropyridine was dissolved in 2-propanol and treated with excess HCl in 2-propanol. The salt was recrystallized from methanol-2-propanol-ether to give 5.0 g. of purified product, M.P. 240–241° C.

*Analysis.*—Calcd. for $C_{15}H_{18}N_2 \cdot HCl$ (percent): N, 10.66; $Cl^{\ominus}$, 13.50. Found (percent): N, 10.63; $Cl^{\ominus}$, 13.51.

EXAMPLE III

3-[2-(1-benzyl)indolyl]-1-methyl-1,2,5,6-tetrahydropyridine (A) 3-[2-(1-benzyl)indolyl]pyridine: A solution of 7.0 g. (0.06 mole) of 3-acetylpyridine, 11.5 g. (0.06 mole) of 1-benzyl-1-phenylhydrazine and 0.2 g. p-toluenesulfonic acid in 100 ml. of dry toluene was refluxed into a Dean-Starke water trap overnight. The solvent was removed in vacuo and the residue (17 g.) was dissolved in 100 ml. of ethylene glycol. The ethylene glycol solution was heated under reflux for 20 hours, then poured into 500 ml. of water. The organic material was extracted into $CHCl_3$ and the dried extracts concentrated in vacuo. The resulting oil was dissolved in boiling ether, filtered through a layer of charcoal and stored in the refrigerator overnight. The crystalline free base which formed amounted to 5.0 g., M.P. 120–121° C.

*Analysis.*—Calcd. for $C_{20}H_{16}N_2$ (percent); N (basic), 4.93. Found: N (basic), 4.84.

(B) 3-[2-(1 - benzyl)indolyl]-1-methyl-1,2,5,6-tetrahydropyridine: The methiodide was prepared as in Example III; M.P. 146–147° C. A 9.4 g. sample of the quaternary compound was dissolved in 200 ml. of methanol and treated with 6 g. of NaBH$_4$. The mixture was heated under reflux for 2 hours, then worked up as in the preceding examples. The crude base (6.5 g.) was chromatographed on 150 g. of Florisil. Elution with benzene-ether (1:1) gave 3 g. of solid, M.P. 100–101° C.

*Analysis.*—Calcd. for $C_{21}H_{22}N_2$ (percent): N, 9.27. Found (percent): N, 9.20.

In a larger run 101 g. of methiodide was treated with 63.3 g. of NaBH$_4$ to give 67.8 g. of crude free base (after treatment with charcoal in boiling-n-hexane).

(C) 3-[2-(1 - benzyl)indolyl] - 1 - methyl-1,2,5,6-tetrahydropyridine maleate: The 3-[2-(1-benzyl)indolyl]-1-methyl-1,2,5,6-tetrahydropyridine was dissolved in 2-propanol and 70 g. of maleic acid was added. The solvent was evaporated, the residue stirred with ether and the crude salt recrystallized from 2-propanol-ether to give 52.2 g. of product, M.P. 161–163° C.

*Analysis.*—Calcd. for $C_{21}H_{22}N_2 \cdot (CHCO_2H)_2$ (percent): N (basic), 3.35; N (total), 6.70. Found (percent): N (basic), 3.36; N (total) 6.69.

EXAMPLE IV

3-[2-(1-benzoyl)indolyl]-1-methyl-1,2,5,6-tetrahydropyridine

A solution of phenylmagnesium bromide in 50 ml. of tetrahydrofuran was prepared using 4.45 g. (0.0283 mole) of bromobenzene and 0.68 g. (0.0283 mole) of magnesium (nitrogen atmosphere). A solution of 6.0 g. (0.0283 mole) of 3-(2-indolyl)-1-methyl-1,2,5,6-tetrahydropyridine (cf. Example II) in tetrahydrofuran was added to the Grignard reagent with stirring. After 0.5 hour the reaction mixture was cooled to −2° C. and 3.98 g. (0.0283 mole) of benzoyl chloride was added over a 15 minute period at 0° C. After stirring for 12 hours at room temperature this mixture was hydrolyzed with cold saturated NH$_4$Cl solution. The THF layer was separated, dried and evaporated and the residue chromatographed on Florisil using benzene as eluent. An oily free base (3.0 g.) was obtained, $\nu^{CHCl_3}_{max.}$ no indole N-H in the 3400–3500 cm.$^{-1}$ region.

3-[2-(1-benzoyl)indolyl]-1-methyl-1,2,5,6-tetrahydropyridine hydrochloride

An ethered solution of 3.0 g. of 3-[2-(1-benzoyl)indolyl]-1-methyl-1,2,5,6-tetrahydropyridine was treated with a slight excess of HCl in 2-propanol. The salt (2.0 g.) had M.P. 242–244° C.

$\nu^{KCl}_{max.}$ 1690 (indole N—C—) cm.$^{-1}$
$\quad\quad\quad\quad\quad\quad\quad\quad\quad\quad\quad\ \ \|$
$\quad\quad\quad\quad\quad\quad\quad\quad\quad\quad\quad\ \ O$

*Analysis.*—Calcd. for $C_{21}H_{20}N_2O \cdot HCl$ (percent): N, 7.95; HCl, 10.35. Found (percent): N, 8.09; HCl, 10.45.

EXAMPLE V

3-[2-(1-p-chlorobenzyl)indolyl]-1-methyl-1,2,5,6-tetrahydropyridine

3-[2-(1-p-chlorobenzyl)indolyl]-1-methylpyridinium iodide

The hydrazone was prepared as in Example IV in a toluene solution using 24.2 g. (0.20 mole) of 3-acetylpyridine and 46.4 g. (0.20 mole) of 1-p-chlorobenzyl-1-phenylhydrazine. The crude hydrazone (46 g.) in 300 ml. of ethylene glycol was heated under reflux overnight. The ethylene glycol was distilled in vacuo and the residue chromatographed on alumina. Unreacted starting material was first eluted with n-hexane, then the product was eluted with ether. Recrystallization of this material from n-hexane gave 28.0 g. of product, M.P. 97–100° C. The material was dissolved in 50 ml. of acetone, 50 ml. of methyl iodide was added and the mixture was heated under reflux for three hours. The methiodide was collected and washed with ether; yield of first and second crops 33.5 g. M.P. 156–158° C.

*Analysis.*—Calcd. for $C_{21}H_{18}ClIN_2$ (percent): N (basic), 6.08. Found (percent): N (basic), 6.04, (both nitrogens are basic enough to titrate).

3-[2-(1-p-chlorobenzyl)indolyl]-1-methyl-1,2,5,6-tetrahydropyridine maleate

A 33 g. sample of the methiodide described above was suspended in 200 ml. of methanol and treated with 5.7 g. of NaBH$_4$. After heating under reflux overnight the reaction mixture was worked up as in previous examples. The crude base obtained was dissolved in ether, the solution was treated with charcoal and filtered through Dicalite. The ethereal filtrate was treated with 8.3 g. maleic acid in acetone. The salt precipitated as an oil which solidified on stirring; yield 24 g., M.P. 140–155° C. Recrystallization from 2-propanol-ether and then from acetone-ether gave 10.5 g. of salt, M.P. 172–173° C.

*Analysis.*—Calcd. for $C_{21}H_{24}ClN_2 \cdot (CHCO_2H)_2$ (percent): C, 66.29; H, 5.56; N (basic), 6.18; N (total), 6.18. Found (percent): C, 66.22; H, 5.75; N (basic), 6.03; N (total), 6.09.

What is claimed is:

1. A compound selected from the group consisting of compounds of the formula:

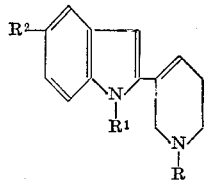

in which R is methyl, R$^1$ is benzyl, benzoyl, halogen substituted benzyl, or halogen substituted benzoyl, and R$^2$ is hydrogen, and pharmacologically acceptable salts thereof.

2. A compound according to claim 1 which is 3-[2-(1-benzyl)indolyl]-1-methyl-1,2,5,6-tetrahydropyridine.

3. A compound according to claim 1 which is 3-[2-(1-benzoyl)indolyl]-1-methyl-1,2,5,6-tetrahydropyridine.

4. A compound according to claim 1 which is 3-[2-(1-p-chlorobenzyl)-indolyl]-1-methyl - 1,2,5,6 - tetrahydropyridine.

References Cited

UNITED STATES PATENTS 2,872,453   2/1959   Jacob et al. _____ 260—295

HENRY R. JILES, Primary Examiner

A. L. ROTMAN, Assistant Examiner

U.S. Cl. X.R.

260—296, 999